United States Patent [19]
Herrick et al.

[11] 4,416,264
[45] Nov. 22, 1983

[54] SOLAR HEAT COLLECTOR

[75] Inventors: Carlyle S. Herrick; Richard S. Alben, both of Schenectady, N.Y.

[73] Assignee: General Electric Company, Schenectady, N.Y.

[21] Appl. No.: 201,811

[22] Filed: Oct. 29, 1980

[51] Int. Cl.³ .............................................. F24J 3/02
[52] U.S. Cl. .................................. 126/442; 126/449; 126/450; 165/DIG. 10
[58] Field of Search ............... 126/442, 450, 449, 417, 126/443; 165/DIG. 10

[56] References Cited

U.S. PATENT DOCUMENTS

| | | | |
|---|---|---|---|
| 3,866,285 | 2/1975 | Clark | 126/450 X |
| 3,875,925 | 4/1975 | Johnston | 126/449 X |
| 4,072,141 | 2/1978 | Fillios et al. | 126/429 X |
| 4,082,082 | 4/1978 | Harvey | 126/449 X |
| 4,091,793 | 5/1978 | Hermann et al. | 126/270 |
| 4,116,225 | 9/1978 | Ortabasi | 126/271 |
| 4,119,083 | 10/1979 | Heyen et al. | 126/270 |
| 4,129,117 | 12/1978 | Harvey | 126/449 X |
| 4,144,875 | 3/1979 | Bruno et al. | 126/271 |
| 4,212,292 | 7/1980 | Reinert | 126/449 |
| 4,304,223 | 12/1981 | Novinger | 126/449 X |

OTHER PUBLICATIONS

Y. Bayazitoglu & S. Asgarpour, "Performance Calculations of Tubular Cover Collectors", Jul. 30, 1979, Solar Energy, vol. 24, pp. 105-109, (1980).

Dennis Jones, "Development of a High Performance Air Heater Through Use of a Evacuated Tube Cover Design", Solaron Corp., pp. 9-53 to 9-55, (1980).

Herrick, "Optical Transmittance Measurement on a Solar Collector Cover of Cyllindrical Glass Tubes", Solar Energy, 1982, vol. 28, pp. 5-11.

*Primary Examiner*—Larry Jones
*Attorney, Agent, or Firm*—Richard J. Traverso; James C. Davis, Jr.; James Magee, Jr.

[57] ABSTRACT

A solar heat collector is described in which a filamentary heat absorber is disposed within a housing having opaque, heat-insulated sides and bottom and a plurality of partially evacuated tubular members substantially transparent to incident solar radiation mounted on the top thereof. Means are provided for supplying fluid flow to the housing and removing fluid flow from the housing to provide for the transfer of heat energy from the filaments in the absorber to the fluid flow. Light entering the housing through the transparent members enters the filamentary heat absorber, is internally reflected and absorbed. That portion of the light passing through the filamentary heat absorber strikes a reflecting layer, which redirects heat and light back into the filamentary heat absorber.

3 Claims, 5 Drawing Figures

PARTIALLY EVACUATED TUBE—FIBER ABSORBER SOLAR COLLECTOR

SOLAR HEAT COLLECTOR

BACKGROUND OF THE INVENTION

Exemplary solar heat collectors are described in U.S. Pat. No. 4,144,875—Bruno et al.; U.S. Pat. No. 4,119,083—Heyen et al.; U.S. Pat. No. 4,115,225—Ortabasi; and U.S. Pat. No. 4,091,793—Herman et al. However, as far as is known, the prior art does not disclose utilization of a solar energy collector structure as disclosed by the present inventors providing improved thermal efficiency at all angles of incidence and particularly at angles of incidence greater than 60° as defined herein either alone or in the combinations claimed herein.

DESCRIPTION OF THE INVENTION

The solar heat collector of this invention comprises a housing and appurtenances therefore. The housing encloses a flow volume containing a filamentary heat absorber as characterized herein below. The housing has opaque, heat-insulated side walls and bottom wall (preferably of structural foam made from a high temperature resistance expanded polymer) and a plurality of hollow, thin-walled, cylindrical tubular members substantially transparent to solar radiation positioned on top of the housing. In the practice of the invention, the tubular members are at least partially evacuated and can be fully evacuated. Further, the tubular members may contain an inert gas such as, for example, krypton, xenon, argon, etc. Means in flow communication with the flow volume are provided for removing heated fluid flow therefrom and for introducing fluid flow thereto to be heated. The filamentary heat absorber, which is oriented in the flow volume such that the fluid flow will occur longitudinally thereof is made up of fibers having a size in the range of from about 1 to about 10 mils in diameter, said fibers further are coated with and bonded together by solidified heliothermal conversion material such that the filamentary heat absorber has a dimensionally stable matted configuration having a substantially uniform density therethrough in the range of from about 1 to about 16 ounces per cubic foot and having a substantially uniform optical transmission therethrough in the range of from about 5 to about 25 percent. Means for reflecting light is located within the housing adjacent the filamentary heat absorber opposite the solar transparent cover, being oriented to direct back toward the filamentary heat absorber such solar radiation impinging thereon as passes through the filamentary heat absorber. At the same time, this optical reflector also reflects light back into the filamentary heat absorber whereby the entire volume thereof acquires a more uniform heat distribution therethrough contributing considerably to the efficiency of heat transfer to the fluid flow therethrough.

In addition, radiation impinging on the surface of an individual filament or fiber of the absorber is partially absorbed and converted to heat and partially reflected to impinge on other fibers or filaments. These partial reflections are extensive and have the effect of dispersing optical "hot spots" caused by non-uniform optical transmissions through the tubular cover so that said non-uniform impingements can be handled with high thermal efficiency.

Considering the solar heat collector of this invention as being in the general shape of a panel enclosing a flow volume having its length extending in the general direction of fluid flow and its thickness extending in the general direction of the passage of the light, terms used herein with respect to fluid flow through the filamentary heat absorber are defined as follows:

"longitudinal" is descriptive of the direction of the length or breadth of the flow volume; and "transverse" is the absorber dimension perpendicular to the plane of the transparent cover.

"Angle-of-incidence" is understood to be the angle between the direct beam of the sun and the perpendicular to the plane of the transparent cover of the solar collector.

"Filamentary heat absorber" is understood to represent that component of the solar collector which absorbs solar radiation and converts it to thermal energy. Further, the term filamentary is interchangeable with the term fiber.

In the preferred construction the filamentary heat absorber is made of glass fibers coated with black paint (black pigment particles in a polymerizable resin) as the heliothermal conversion layer with adjacent fibers being bonded together by the solidified paint to render the resulting matter configuration dimensionally stable. Preferably fibers to be used have a length-to-thickness ratio of at least about 100:1. Although air is generally contemplated as the fluid employed, in a closed system other gases such as helium, nitrogen or carbon dioxide may be employed instead and, if desired, liquids, such as water may be utilized. Although the invention is illustrated as a single panel, modular construction is also contemplated.

According to the present invention there is provided a solar collector of the aforesaid kind characterized in that the cover consists of a number of sealed and partially evacuated glass tubes which are adjacently arranged proximate to each other.

Preferably, the diameter of the individual glass tubes is from about 1 to about 10 cm.; however, if desired, the diameter may also be substantially larger. For a given tube diameter, the wall thickness of the tube should be kept to a minimum and be limited only by the mechanical strength of the tube.

The glass tubes may be provided with an infrared reflecting layer over at least part of their inner surfaces or a portion thereof. Suitable infrared reflecting layers are made of silver, gold or tin oxide, but are preferably of indium oxide.

BRIEF DESCRIPTION OF THE DRAWINGS

The features of this invention believed to be novel and unobvious over the prior art are set forth with particularity in the appended claims. Understanding of the following description setting forth the manner and process of making and using the invention, the best mode therefore and a more general description of the invention set forth hereinabove is facilitated by reference to the accompanying drawings wherein:

MANNER AND PROCESS OF MAKING AND USING THE INVENTION

Figure 1:
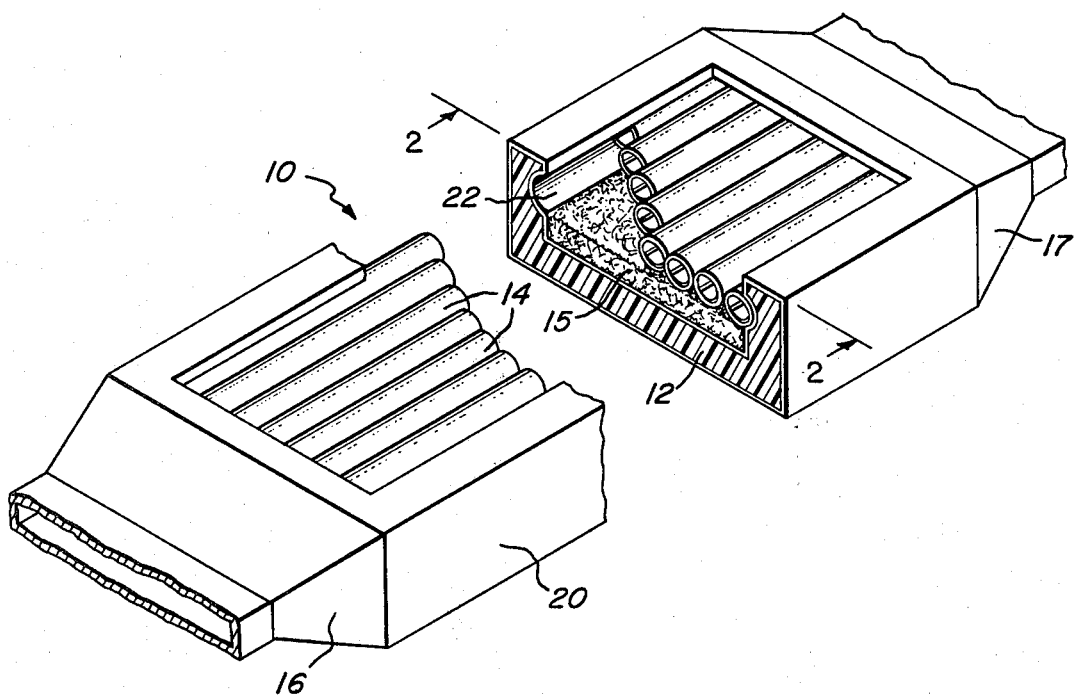
FIG. 1 is a three-dimensional cutaway view of the solar heat collector of this invention.
Figure 2:
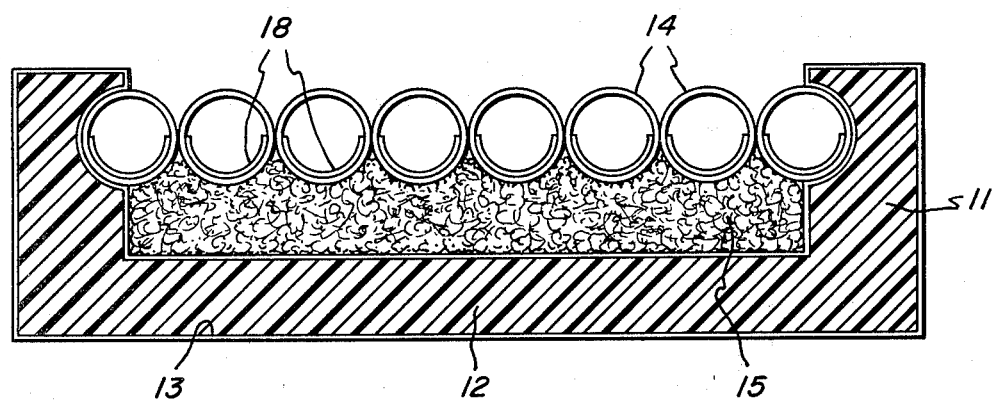
FIG. 2 is a cross section taken on line 2—2 of FIG. 1.

The solar energy collector structure in accordance with the invention comprise a plurality of glass tubes which are adjacently arranged in contact with each other and which are evacuated and sealed on their ends. The glass tubes 14 can be freely arranged adjacent to each other, or alternatively they can be interconnected, for example, by gluing or by otherwise fixing the tubes together. The glass tubes 14 may be provided on their inner surfaces with an infrared reflecting layer 18, for example, of $In_2O_3$. In the solar collector shown in FIG. 1, the infrared reflecting layers 18, extend only over the lower half of the glass tubes. In FIGS. 1 and 2, the glass tubes 14 and the absorber 15 are accommodated in a cabinet-like housing, 20 having groove-like channels 22 which retain the glass tube cover in place.

The inner surface of each glass tube 14 of the solar heat collector can be provided with a reflection-reducing layer (not shown) which is preferably deposited on the infrared reflecting layer 18. In order to increase the mechanical strength the outer surface of the glass tubes can furthermore be provided with a transparent enamel layer (not shown), or by providing a transparent impact resistant polymeric cover sheet above the glass tubes, or by joining the tubes together with a suitable heat-resistant transparent or translucent elastomeric material such as, for example, cross-linked polydimethylsiloxane, to form a generally planar self supporting weather tight cover.

The housing of the solar heat collector 10 of the present invention is characterized in having opaque heat insulated side walls 11 and bottom wall 12 preferably formed as a single unit from foamed phenol-formaldehyde polymer, or similar non-combustion supporting high temperature polymer. Depending upon the operation conditions, various foamed and cellular structural plastic materials may be used. As a safety feature, in those instances in which the collector body (side 11 and bottom 12) has a tendency to release harmful gaseous products (i.e., unreacted residual monomer or degradation products the collector body should be provided with a coating of paint or a layer of metal foil over the inside surface thereof in order to prevent the entry of such noxious products into the working fluid flow. In addition, collector bodies made of expanded polymer should have the outside surfaces thereof coated with a primer and a coating material impermeable to water and sunlight to prevent degradation.

In FIGS. 1 and 2 as shown the flow volume so defined is occupied by the filamentary heat absorber extending along much of the length thereof between inlet passage 16 and outlet passage 17. Fluid flow passing from the inlet passage way to the outlet passage way must pass around the fibers within and comprising absorber 15.

Filamentary heat absorber 15 which substantially encloses the space between the cover and the reflector comprises a matted configuration of heterogeneously disposed thin fibers or filaments, such as metallic fibers, ceramic fibers, mineral fibers, etc. Typical materials are glass, alumina, carbon, silica, plastic, metals, etc. The fibers are coated with a heliothermal conversion layer comprising pigment particles in a polymerizable resin vehicle, which not only provides a high absorptivity for converting sunlight to thermal energy but also serves to interconnect adjacent fibers and provide dimensional stability to the matted configuration.

The critical aspects of this invention, in addition to the absorber 15 are (1) the utilization of an evacuated tube cover, (2) the fiber size utilized, (3) the ultimate density of the matted configuration, (4) an internal reflector behind the absorber, (5) structural foamed body of phenolic polymer (e.g. Esfen TM ), and (6) the optical transmission of the absorber. By utilizing fibers having a size of from about 1 to 10 mils in diameter, coating the fibers with the requisite heliothermal conversion layer and accumulating these coated fibers in a matted, dimensionally-stable configuration to provide a substantially uniform density in the range of from about 1 to about 16 ounces per cubic foot and a substantially uniform optical transmission in the range of from about 5 to about 25 percent, a number of advantageous benefits ensue. Thus, in the density range recited, it becomes possible to provide an adequate coolant flow velocity at a low fluid flow pressure drop therethrough. This in turn provides better heat transference from the heliothermal conversion layer to the fluid flow, the temperature of the heliothermal conversion layer is reduced, and, as a result, thermal losses by radiation, conduction and convection are lower.

Of even greater importance is the fact that by utilizing a solar collector comprising the elements defined above and more particularly utilizing a cover consisting of evacuated tubes, having a pressure therein below 150 mm. Hg; and preferably below ½ mm. Hg., an absorber as previously defined and an appropriate housing for example, as disclosed by the invention herein, one is able to realize a substantial increase in the optical transmission and thermal conversion of solar radiation entering said solar energy collector at all angles of incidence including angles greater than 60°, but less than 90° and specifically at angles less than 30°.

Further, the utilization of a structural foamed body of phenolic polymer in combination with the fiber absorber and evacuated tubular cover provides a solar collector which tolerates stagnation temperatures, i.e. those temperatures corresponding to the maximum temperature rise within the collector under "no-flow" conditions for the coolant, and without structural harm or operational impairment (e.g. fracture of the cover or warpage of the absorber or housing.)

In the past, both tubular covers and fiber absorbers of varying specifications and descriptions have been shown in the art. However, as far as the inventors have been able to determine, nothing has been published nor any reference cited which discloses the combination of the evacuated tube cover of the present invention in combination with the unique absorber and housing as disclosed by the inventors.

In use, the solar heat collector 10 receives direct solar radiation through the evacuated tubes comprising the cover thereof while fluid flow is directed through the absorber 15. The solar radiation passing through the evacuated tubes strikes the heliothermal conversion layer and is, in major part, converted to thermal energy. Additional portions of the solar radiation are reflected from one coated fiber to another with additional absorption occurring with subsequent reflections and impingements. Still further, such solar radiation as survives transit through the thickness of absorber 15 will exit from the far side and strike optical reflector 13. As a result, the backside of absorber 15 receives radiation reflected back to it from optical reflector 13. Such radiation enters absorber 15 from the under side and repeats the absorption/reflection sequence whereby a larger percentage of the radiation becomes converted to thermal energy. Having the absorber 14 receive light and heat from both sides in this manner improves the uniform dispersion of heat therethrough, and makes longitudinal flow feasible.

Figure 3:
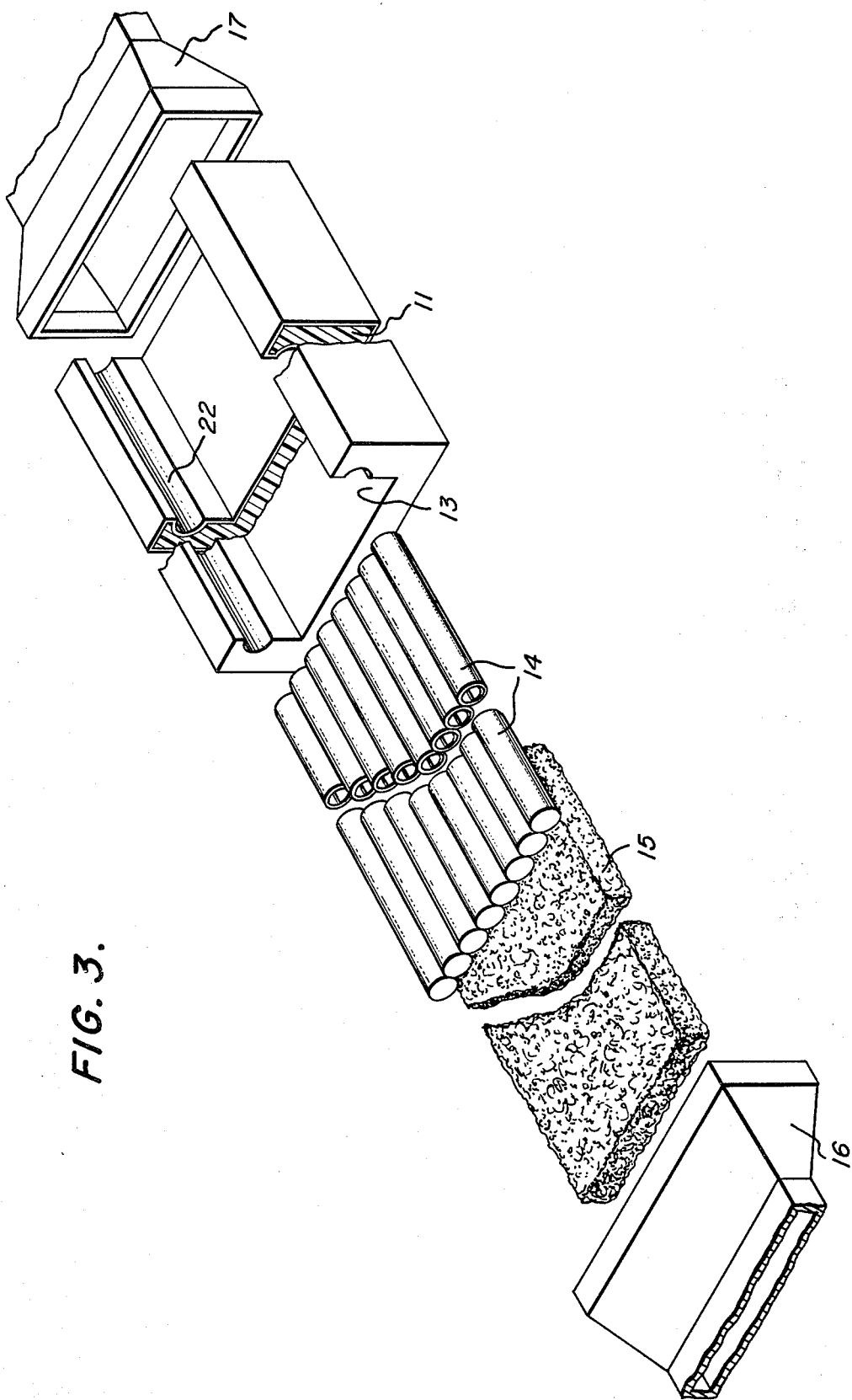
FIG. 3 is an exploded view of the solar heat collector of this invention.
Figure 4:
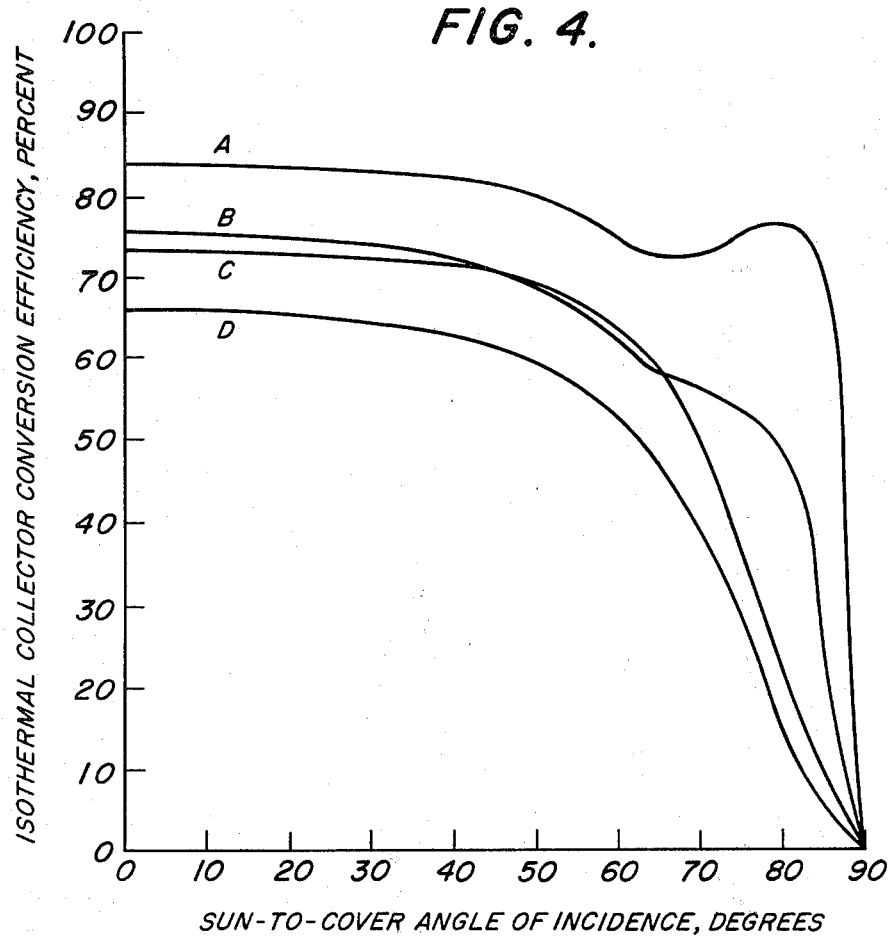
FIG. 4 is a graphic comparison between solar heat collectors containing on the one hand a state-of-the-art flat plate absorber prepared according to such guidance as is available in ASHRAE Handbook and Product Directory 1974 Applications, Chapter 59, page 6 (Published by American Society of Heating Refrigerating and Air Conditioning Engineers, Inc., 345 East 47th St., New York, N.Y.), as represented by line D of FIG. 4, and on the other hand, a flat absorber and tubular glass cover insulating means as taught in Hermann et al. as represented by Line B. Further comparison is given utilizing data compiled based on a solar collector according to the teachings of the present invention utilizing two flat glass cover means and a filamentary absorber of Heyen, et al., which is reflected by Line C of FIG. 4, and a filamentary heat absorber in combination with a reflecting means and collector body which utilizes evacuated tube cover means according to the teachings of the instant invention as represented by Line A of FIG. 4.
Figure 5:
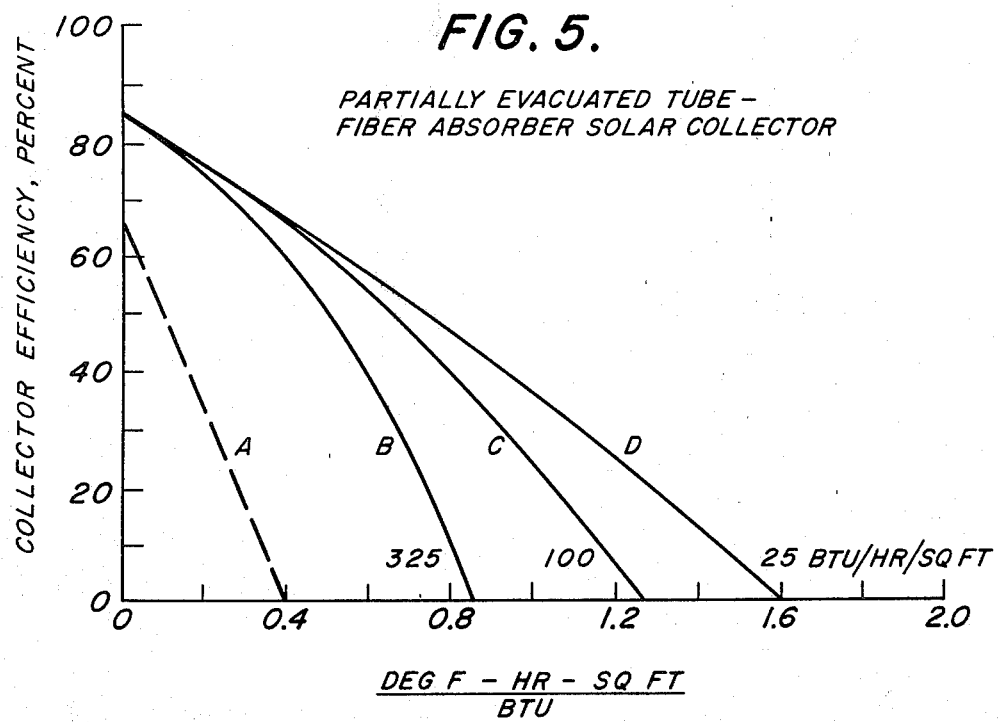
FIG. 5 is a graphic comparison between a solar heat collector (curve A) constructed according to such guidance as is available in the art and on the other hand a solar collector of the present invention.

The unexpected nature of the performance of the solar energy collector of the present invention consisting of a filamentary heat absorber working in concert with the evacuated tubes as previously disclosed, is shown by the test results set forth graphically in FIGS. 4 and 5. Referring to FIG. 4, curve A represents a solar collector constructed according to the present invention, wherein the isothermal conversion efficiency (percent) is compared to sun-to-cover angle of incidence (degrees). In comparison to curve A, curve B denotes a comparison of the solar collector of the present invention with a solar collector as disclosed in Hermann et al. (U.S. Pat. No. 4,091,793). Further in comparison to curve A, curve C and curve D represent comparison tests run on solar collectors having two flat glass covers and a fiber absorber and flat absorber, respectively. More specifically, the solar collector represented by curve C had a fiber absorber made with glass fibers sprayed black having absorber dimensions of a fiber diameter of about 3 mils; uniform density of about 3 ounces per cubic foot and optical transmission of about 10 percent. As represented by curve D of FIG. 3, the flat absorber utilized therein is as employed, for example, in the Hermann et al. patent (U.S. Pat. No. 4,091,793), although the cover of said solar energy devices comprises two flat transparent covers.

Referring now to FIG. 5, curve A as previously stated represents a solar collector constructed according to such guidance as is known in the art. Curve B, C and D represents characteristic curves for the solar collector of the present invention. More specifically, curve A shows that the collector represented thereby, when exposed to the full sun, is less efficient than the solar collector of the present invention. Curves B, C and D show that as the intensity of the solar radiation received by the collector of the present invention decreases from full sun to less than 1/13th full sun at 25 BTU/HR/SQ. FT. (along the X axis), the stagnation temperature rise per unit of incoming radiation rises as the intensity of incoming radiation falls and in fact almost doubles when going from full sun to 1/13th full sun as opposed to known solar collectors where the absorber aperature is equal in magnitude to the cover optical aperature. Stagnation temperature is understood to be a measure of the thermal efficiency of a collector under adiabatic conditions. The higher the stagnation temperature, the greater the thermal efficiency of the collector.

Thus, as can be seen, from FIGS. 4, 5 and Table I below, the efficiency of the solar energy collector structure of the present invention offers a substantial advancement in the art for solar energy collectors for conversion of thermal energy when the solar energy impinges upon the surface of the solar energy collector at all angles, and particularly at angles of incidence of greater than 60°.

As shown in Table I, a comparison is given for a conventional solar energy collector represented by column "D" which corresponds to curve D of FIG. 4 and Column "A" representing a solar energy collector according to the present invention, corresponding to curve A of FIG. 4. The present increase in efficiency at corresponding angles of incidence is reflected in Column E of Table I. Thus, as the angle-of-incidence increases from 0° to 80°, the percent efficiency increase (column E), increases from 27 percent to 411 percent or by a factor of approximately fifteen times.

TABLE I

| Sun-to-Cover Angle of Incidence (Degrees) | A Percent Isothermal Efficiency | D Percent Isothermal Efficiency | E Percent Efficiency Increase |
| --- | --- | --- | --- |
| 0 | 84 | 66 | 27 |
| 10 | 84 | 66 | 27 |
| 20 | 83.8 | 65.5 | 28 |
| 30 | 83.4 | 64.5 | 29 |
| 40 | 83.2 | 62.8 | 32 |
| 50 | 80.2 | 59.7 | 34 |
| 60 | 75.0 | 52.5 | 43 |
| 70 | 72.8 | 38.8 | 88 |
| 80 | 76.7 | 15.0 | 411 |
| 90 | 0 | 0 | 0 |

BEST MODE CONTEMPLATED

The solar heater collector construction proposed for the best mode utilizes for the construction of the side walls and bottom wall a phenol-formaldehyde foamed polymer (for example, Esfen ™ roof insulation made by Building Products of Canada, Ltd.). Intimate contact between the evacuated tube cover and the solar heat collector is achieved in accordance with the invention when the end tube portions are connected to the collector by means of an adhesive. The adhesive is preferably translucent or transparent. The flow volume defined between the evacuated tube 14 cover, bottom wall 12, and side walls 11, is filled with an absorber construction 15 made of fiberglass fibers covered with and bonded together by black paint. The fiber size is about one mil in diameter and the absorber has a density of about three ounces per cubic foot with an optical transmission of 10 percent. The phenolic foam structure is covered completely with one or more layers of aluminum paint to limit the release of volatile organic vapors to acceptable levels in reference to the surface of the collector opposed to the tubular cover the aluminum paint serves as the reflecting means or reflector.

What is claimed is:

1. A solar energy collector structure comprising: a housing enclosing a flow volume having heat insulative sides of structural foam, a plurality of partially evacuated tubular members substantially transparent to incident solar radiation mounted on the top of said housing, an absorber of filamentary material contained within said housing, said fibers being positioned to intercept the radiation transmitted through the evacuated tubular member cover, and a heat resistant transparent elastomer positioned between each tubular member to chemically bond said tubes and provide a substantially planar, self-supporting, weather tight tubular cover.

2. A solar energy collector structure comprising: a housing enclosing a flow volume having heat insulative sides and bottom of a structural foam; a reflective means applied to the inner surface of said housing; a plurality of partially evacuated tubular members substantially transparent to incident solar radiation mounted on the top of said housing; an absorber of filamentary material contained within said housing; said reflective means being disposed between said filamentary heat absorber and said inner housing surface, said reflective means also being oriented to direct back toward said filamentary heat absorber such solar radiation impinging thereon as passes through said filamentary heat absorber, said filamentary heat absorber being of such fiber size and spatial distribution as to allow transmission of a portion of a solar radiation therethrough to said reflector and a heat resistant transparent elastomer position between each tubular member to provide a substantially planar, self-supporting, weather tight tubular cover.

3. A solar energy collector structure providing improved thermal efficiency comprising:
a housing enclosing a flow volume; said housing having opaque, heat insulative sides and bottom of a structural phenolic foam; a plurality of partially evacuated tubular members substantially transparent to incident solar radiation positioned on top of said housing; a filamentary heat absorber, having a substantially uniform density therethrough in the range of from about 1 to 16 ounces per cubic foot and having a substantially uniform optical transmission therethrough in the range of from about 5 to 25 percent, coated with solid heliothermal material; and a heat resistant cross-linked polydimethylsiloxane positioned between each tubular member to chemically bond the tubes and provide a substantially planar, self-supporting, weather tight tubular cover.

* * * * *